(12) United States Patent
Tsuchiya et al.

(10) Patent No.: US 8,546,032 B2
(45) Date of Patent: Oct. 1, 2013

(54) FUEL CELL DEVICE

(75) Inventors: Katsuhisa Tsuchiya, Kitakyushu (JP);
Toshiharu Ooe, Kitakyushu (JP);
Tsukasa Shigezumi, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 459 days.

(21) Appl. No.: 12/788,585

(22) Filed: May 27, 2010

(65) Prior Publication Data

US 2010/0304242 A1 Dec. 2, 2010

(30) Foreign Application Priority Data

May 28, 2009 (JP) ................................. 2009-129166

(51) Int. Cl.
*H01M 8/04* (2006.01)
*H01M 8/06* (2006.01)

(52) U.S. Cl.
USPC ......................................... 429/429; 429/423

(58) Field of Classification Search
USPC .................................................. 429/423, 429
See application file for complete search history.

(56) References Cited

U.S. PATENT DOCUMENTS

| | | | |
|---|---|---|---|
| 6,641,625 B1 | 11/2003 | Clawson et al. | |
| 6,884,533 B2 | 4/2005 | Stocker | |
| 2003/0224230 A1 | 12/2003 | Stocker | |
| 2004/0038095 A1 * | 2/2004 | Kushibiki et al. | 429/20 |
| 2005/0153179 A1 * | 7/2005 | Ukai et al. | 429/22 |
| 2010/0203404 A1 | 8/2010 | Miyazaki | |
| 2010/0310951 A1 * | 12/2010 | Hatada | 429/423 |

FOREIGN PATENT DOCUMENTS

| | | | |
|---|---|---|---|
| CA | 2689674 A1 | 12/2008 | |
| CA | 2697652 A1 | 3/2009 | |
| JP | 2004-319420 A | 11/2004 | |
| JP | 2007-242626 A | 9/2007 | |
| JP | 2008-053209 A | 3/2008 | |
| JP | 2008-159467 A | 7/2008 | |
| JP | 2008-243596 A | 10/2008 | |
| JP | 2009-037871 A | 2/2009 | |
| JP | 2009-110970 A | 5/2009 | |
| JP | 2009-196834 A | 9/2009 | |
| WO | WO2009028327 A1 * | 3/2009 | |

OTHER PUBLICATIONS

Extended European Search Report for European Application No. 10164037.3, dated Oct. 1, 2010, 8 pages.

* cited by examiner

*Primary Examiner* — Patrick Ryan
*Assistant Examiner* — Muhammad Siddiquee
(74) *Attorney, Agent, or Firm* — Brinks Hofer Gilson & Lione

(57) ABSTRACT

The fuel cell device has a control device for conducting, at the time of startup, a partial oxidation reforming reaction (POX) inside the reformer, then an auto-thermal reforming reaction (ATR) inside the reformer, then a steam reforming reaction (SR) inside the reformer; a water supply device is provided with a pump for intermittently supplying extremely small amounts of water to the reformer using pulsed control; the control device controls the fuel supply device, the reforming air supply device, and the water supply device to respectively supply target supply flow rates of fuel, reforming air, and water based on the outputs of various sensors; and, in the ATR region, the control device suppresses changes in the flow rate of fuel supplied by the fuel supply device during at least a predetermined interval following the supply of water by the pump.

10 Claims, 11 Drawing Sheets

FUEL CELL DEVICE

RELATED APPLICATIONS

This application claims priority under 35 U.S.C. §119 to Japanese Patent Application No. 2009-129166 filed on May 28, 2009, the entire content of which is hereby incorporated by reference.

BACKGROUND OF THE INVENTION

1. Technical Field

The present invention relates to a fuel cell device, and more particularly to a fuel cell device in which fuel is reformed using a reformer and power is generated by a fuel cell using the reformed fuel and air.

2. Description of the Related Art

In recent years, various fuel cell devices provided with fuel cells capable of obtaining electrical power by generating electricity using fuel (hydrogen gas) and air, and with auxiliary equipment for operating such fuel cells, have been proposed as next-generation energy sources.

One method for producing the fuel (hydrogen gas) needed for electrical power generation in a fuel cell is the steam reforming method; Japanese Patent Unexamined Publication No. 2008-53209 (JP-2008-53209A), for example, proposes supplying water stored in reservoir tank to a reformer via a water supply pipe, using a water pump as a water supply means for supplying water (pure water) to the reformer.

SUMMARY OF THE INVENTION

Details are described below, but at the time of startup of a fuel cell device, fuel and reforming air are first supplied into the reformer, and a partial oxidation reforming reaction (POX) is conducted in which fuel is ignited and combusted with reforming air, then an auto-thermal reforming reaction (ATR) is conducted in which fuel, reforming air, and water (pure water) are supplied into the reformer to concurrently conduct a partial oxidation reforming reaction (POX) and a steam reforming reaction (SR), described below, then fuel gas and water (pure water) are supplied into the reformer to conduct a steam reforming reaction (SR).

In the fuel cell device, water (pure water) must be supplied to the reformer when conducting the auto-thermal reforming reaction (ATR) and the steam reforming reaction (SR), and in the ATR region in particular, where the water supply flow rate is extremely small, it is necessary to supply an extremely small flow rate of water, i.e., a few milliliters per minute. To accurately and stably supply such an extremely small flow rate of water requires the use of a specialized pump.

However, the use of specialized pumps of this type, capable of continuously supplying extremely small flow rate of water, is difficult in the relatively high-temperature environment fuel cell device; moreover such pumps are complex in structure and high in price, and therefore difficult to apply in real world applications.

As the result of diligent research, the inventors have found a way to achieve the supply of an extremely small flow rate of water by intermittently spraying water under pulsed control using a pulse pump. Because water is supplied intermittently, this method can be used even in a high temperature environment, and a simple structure, low-cost pump can be used; moreover pulsed control, which is simple to control, can be adopted.

In the ATR region, water must be vaporized in order to carry out steam reforming, and the increase in volume of water which occurs when water is vaporized causes pressure inside the reformer to increase. For this reason, because the supply of water is intermittent and small in flow rate, water vaporizes and pressure rises in a short period of time when water is supplied, then immediately drops, whereby pressure fluctuations are generated. Since it becomes difficult to supply fuel gas into the reformer when the pressure inside the reformer rises, a fuel supply flow rate detection sensor detects the state in which the fuel supply flow rate is below a target value during a pressure rise, and immediately thereafter control is executed to increase the supply of fuel based on a judgment that the supply of fuel is insufficient. A problem arises, however, in that the pressure actually drops in the next instant, changing the state to one in which fuel can be easily supplied, so that even though there is actually no need to increase fuel, the result is that fuel gas is oversupplied in the net instant. Moreover, when excess fuel gas is supplied, there is an insufficient quantity of water relative thereto if the reformer temperature is high, leading to the problem of carbon deposition inside the reformer. There is thus a problem in that when intermittently supplying and spraying water under pulsed control using a pulse pump, is not possible to ensure a stable fuel gas supply and a stable auto-thermal reforming reaction in the ATR region.

It is therefore an object of the present invention to provide a fuel cell device capable of solving the problems caused by water vapor pressure fluctuation which arise when water is intermittently supplied to a reformer via a pump, and to thereby implement a stable auto-thermal reforming reaction (ATR).

The above object is achieved according to the present invention by providing a fuel cell device for generating power by using fuel being reformed by a reformer, said fuel cell device comprising: a fuel supply device for supplying fuel to the reformer; a reforming air supply device for supplying reforming air to the reformer; a water supply device for producing pure water and supplying the pure water to the reformer; a fuel supply flow rate detection sensor for detecting the flow rate of fuel supplied by the fuel supply device; an reforming air supply flow rate detection sensor for detecting the flow rate of reforming air supplied by the reforming air supply device; a water supply flow rate detection sensor for detecting the flow rate of water supplied by the water supply device; and a control device for controlling, at the time of startup of the fuel cell device, the flow rate of fuel supplied by the fuel supply device, the flow rate of reforming air supplied by the reforming air supply device, and the flow rate of water supplied by the water supply device to supply fuel and reforming air into the reformer to conduct a partial oxidation reforming reaction (POX), then to supply fuel, reforming air, and water into the reformer to conduct an auto-thermal reforming reaction (ATR), then to supply fuel and water into the reformer to conduct a steam reforming reaction (SR); wherein the water supply device is furnished with a pump for intermittently supplying water to the reformer; the control device controls the fuel supply device, the reforming air supply device, and the water supply device respectively to supply target supply flow rates of fuel, reforming air, and water based on the respective outputs of the fuel supply flow rate detection sensor, the reforming air supply flow rate detection sensor, and the water supply flow rate detection sensor; and the control device, in the ATR region, suppresses changes in the flow rate of fuel supplied by the fuel supply device during at least a predetermined interval following the supply of water by the pump.

In the present invention thus constituted, water is first intermittently supplied to a reformer under pulsed control using a pump, therefore the fuel cell device can be used in a high temperature environment, a simple structure and low-cost pump can be employed, and simple pulsed control can be adopted. In the ATR region, changes in the supply flow rate of fuel by the fuel supply device during at least a predetermined interval following the supply of water by a pump are suppressed so that an oversupply of fuel arising immediately after the supply of water as described above can be prevented, and as a result, a stable fuel supply and stable auto-thermal reforming reaction is possible in the ATR region under intermittent control using a simple structure and low-cost pump.

In a preferred embodiment of the present invention, the control device restricts the supply of fuel by the fuel supply device during the predetermined interval following the supply of water by the pump.

In the present invention thus constituted, the supply of fuel by the fuel supply device is restricted during the predetermined interval following the supply of water by the pump, therefore an oversupply of fuel following pressure fluctuations caused by an intermittent supply of water into the reformer can be reliably prevented.

In another preferred embodiment of the present invention, the control device reduces the control gain of the fuel supply device more in the ATR region than in the POX region and the SR region.

In the present invention thus constituted, the control gain of the fuel supply device is most reduced in the APR region compared to other regions at the time of startup, therefore oversupply of fuel or control hunting caused by pressure fluctuations due to intermittent supply of water into the reformer can be reliably prevented even in the ATR region, where an extremely small amount of water is required to be supplied.

In still another preferred embodiment of the present invention, in the ATR region, the control device maintains fixed flow rates, without change, of reforming air supplied by the reforming air supply device and water supplied by the water supply device.

It is conceivable that when the control gain of the fuel supply device is reduced, the control capability for maintaining an accurate fuel supply flow rate state based on a fuel supply flow rate detection sensor will decline, and as a result control problems caused by control delays will arise. In the present invention, the air supply flow rate and water supply flow rate which affect control of the fuel supply are capped in the ATR region at a fixed amount, without variation, and an effort is made to reduce changes in the fuel supply flow rate to a minimum, therefore the occurrence of the afore-mentioned control problems can be reliably prevented by reducing the control gain of the fuel supply device.

In another preferred embodiment of the present invention, the ATR region includes an auto-thermal reforming reaction 1 (ATR1) region in which the flow rate of water supplied is small, and an auto-thermal reforming reaction 2 (ATR2), implemented after the ATR1, in which the flow rate of water supplied is large; and the control device changes at least the target supply flow rate of water in the time of transition from POX to ATR1 and in the time of transition from ATR1 to ATR2, and the control device makes the amount of change per unit time in the target supply flow rate of water smaller for the time of transition from ATR1 to ATR2 than for the time of transition from POX to ATR1.

In the present invention the control gain of the fuel supply device is reduced in the ATR region, therefore oversupply of fuel can be suppressed. The flow rate of water supplied is small in the ATR1 and the ATR2 regions, but pressure fluctuations in the reformer grow large in the ATR2, region where the flow rate of water supplied is greater than in the ATR1 region, so there is a risk of a fuel supply following delay when the fuel target supply flow rate changes upon transition from ATR1 to ATR2, leading to an oversupply fuel, but because the amount of change (target value change gain) per unit time in the target flow rate of water supplied is reduced at a time of transition from ATR1 to ATR2, following delays in the fuel target supply flow rate associated with the reduction in the control gain of fuel supply device can be reliably prevented, and control can be stabilized.

In another preferred embodiment of the present invention, the control device changes the respective target supply flow rates of fuel, reforming air, and water at the time of transition between ATR1 and ATR2 and the time of transition between ATR2 and SR, and the control device reduces the amount of change per unit time in the target supply flow rates of fuel, reforming air, and water at the time of transition between ATR1 and ATR2 and the time of transition between ATR2 and SR, and makes the amount of change per unit time in the target supply flow rates of fuel, reforming air, and water smaller for the time of transition between ATR1 and ATR2 than for the time of transition between ATR2 and SR.

Since the amount of change in the target supply flow rate of water is greater for the time of transition between ATR2 and SR than for the time of transition between ATR1 and ATR2, the intermittent intervals at which water is supplied become closer together, pressure fluctuations within the reformer are alleviated, and pressure is stabilized in a high pressure state, such that the problem of fuel oversupply associated with pressure fluctuations can be alleviated. In the present invention, the control gain for the fuel supply device at the time of transition can be reduced, and the amount of change (target value change gain) per unit time in the target supply flow rate is made smaller for the time of transition between ATR1 and ATR2 than for the time of transition between ATR2 and SR, thereby enabling a high level and skillful balance and resolution of the problems of fuel oversupply and hunting associated with pressure fluctuations and following delays relative to the target supply flow rate of fuel.

In another preferred embodiment of the present invention, the ATR region includes an auto-thermal reforming reaction 1 (ATR1) region in which the flow rate of water supplied is small, and an auto-thermal reforming reaction 2 (ATR2), implemented after the ATR1, in which the flow rate of water supplied is greater than that of the ATR1; and the control device reduces the control gain in the fuel supply device for the ATR1 region and the ATR2 region more than for the POX region or the SR region, and also makes the reduction amount of control gain in the fuel supply device for the ATR2 region to be smaller than that for the ATR1 region.

More water is supplied in the ATR2 region than in the ATR1 region, therefore the closeness of the intervals at which water is supplied increases and pressure is stabilized in a high pressure state so that oversupply of fuel caused by pressure fluctuations can be alleviated. Thus in the present invention, reducing the reduction amount of control gain of the fuel supply device in the ATR2 region to be smaller than that in the ATR1 region enables a simultaneous suppression of fuel oversupply, suppression of the drop in fuel target supply flow rate following performance, and alleviation of following delays.

In another preferred embodiment of the present invention, the control device reduces the control gain in the fuel supply device for the ATR region and the SR region more than for the POX region, and the control device makes the reduction amount of control gain in the fuel supply device for the SR region to be smaller than that for the ATR region.

More water is supplied in the SR region than in the ATR region, therefore the closeness of the intervals at which water is supplied increases and pressure is stabilized in a high pressure state so that oversupply of fuel caused by pressure fluctuations can be alleviated. Therefore in the present invention, by making the reduction amount of control gain in the fuel supply device for the SR region to be smaller than the reduction amount of control gain for the ATR region, fuel oversupply associated with pressure fluctuations can be suppressed, while at the same time the opposite problem of fuel target supply flow rate following delay can also be resolved a high level.

In another preferred embodiment of the present invention, the control device reduces the control gain in the reforming air supply device more in the ATR region than in the POX region.

In the present invention thus constituted, in the ATR region, the control gain of the reforming air supply device is reduced in the same manner as the control gain of the fuel supply device control gain, therefore oversupply of reforming air caused by pressure fluctuations arising from intermittent supply of water into the reformer can be prevented.

In another preferred embodiment of the present invention, in the ATR region, the control device makes the reduction amount of the control gain in the fuel supply device to be greater than the reduction amount of the control gain in the reforming air supply device.

In the present invention thus constituted, as water is supplied intermittently, the flow rate of reforming air supplied into the reformer also fluctuates along with the flow rate of fuel supplied, due to pressure fluctuations within the reformer which carries out the reforming. Therefore, in the present invention, because the control gain of the reforming air supply device is reduced, reforming in which reforming air is oversupplied and control hunting occurs can be even more reliably prevented. Since the flow rate of fuel supplied is far greater compared to the flow rate of reforming air supplied, reforming air is less subject to pressure fluctuations caused by vaporization of water than is fuel. Therefore in the present invention, since the reduction amount of control gain in the fuel supply device is made smaller than the reduction amount of control gain in reforming air supply device, unnecessary following delays relative to the target supply flow rate for reforming air can be reliably prevented.

The above object is also achieved according to the present invention by providing a fuel cell device for generating power by using fuel being reformed by a reformer, said fuel cell device comprising: means for supplying fuel to the reformer; means for supplying reforming air to the reformer; means for producing pure water and supplying the pure water to the reformer; fuel supply flow rate detection means for detecting the flow rate of fuel supplied by the fuel supply means; air supply flow rate detection means for detecting the flow rate of reforming air supplied by the reforming air supply means; water supply flow rate detection means for detecting the flow rate of water supplied by the water supply means; and means for controlling, at the time of startup of the fuel cell device, the flow rate of fuel supplied by the fuel supply means, the flow rate of reforming air supplied by the reforming air supply means, and the flow rate of water supplied by the water supply means to supply fuel and reforming air into the reformer to conduct a partial oxidation reforming reaction (POX), then to supply fuel, reforming air, and water into the reformer to conduct an auto-thermal reforming reaction (ATR), then to supply fuel and water into the reformer to conduct a steam reforming reaction (SR); wherein the water supply means intermittently supplies water to the reformer; the control means controls the fuel supply means, the reforming air supply means, and the water supply means respectively to supply target supply flow rates of fuel, reforming air, and water based on the respective outputs of the fuel supply flow rate detection means, the reforming air supply flow rate detection means, and the water supply flow rate detection means; and the control means, in the ATR region, suppresses changes in the flow rate of fuel supplied by the fuel supply means during at least a predetermined interval following the supply of water by the water supply means.

According to the fuel cell device of the present invention, the problem of water vapor pressure fluctuations arising from the intermittent supply of water to the reformer by a pump can be resolved, and a stable auto-thermal reforming reaction (ATR) can be conducted.

The above and other objects and features of the present invention will be apparent from the following description by taking reference with accompanying drawings employed for preferred embodiments of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
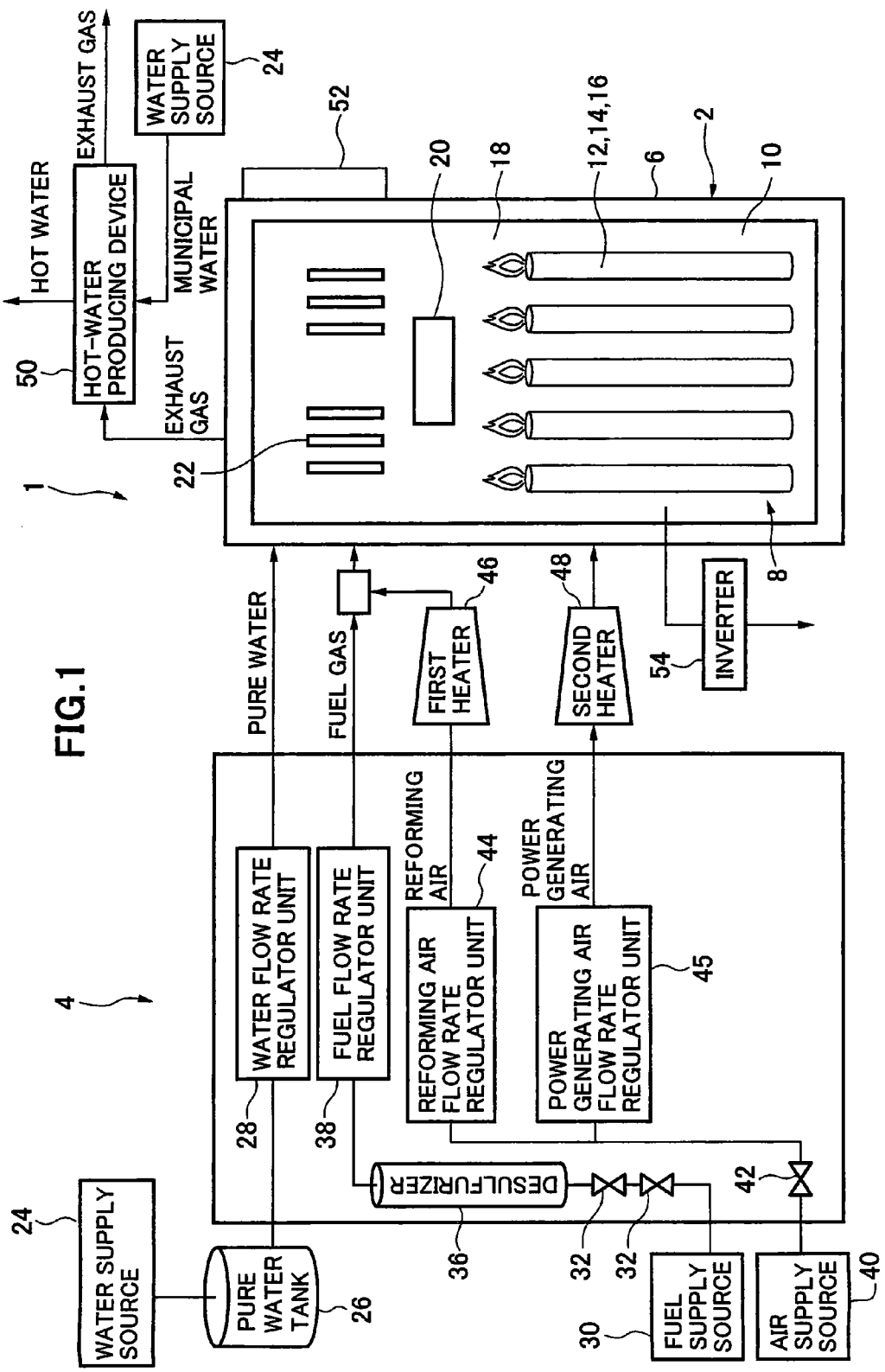
FIG. 1 is an overview schematic view showing a solid oxide fuel cell (SOFC) device according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
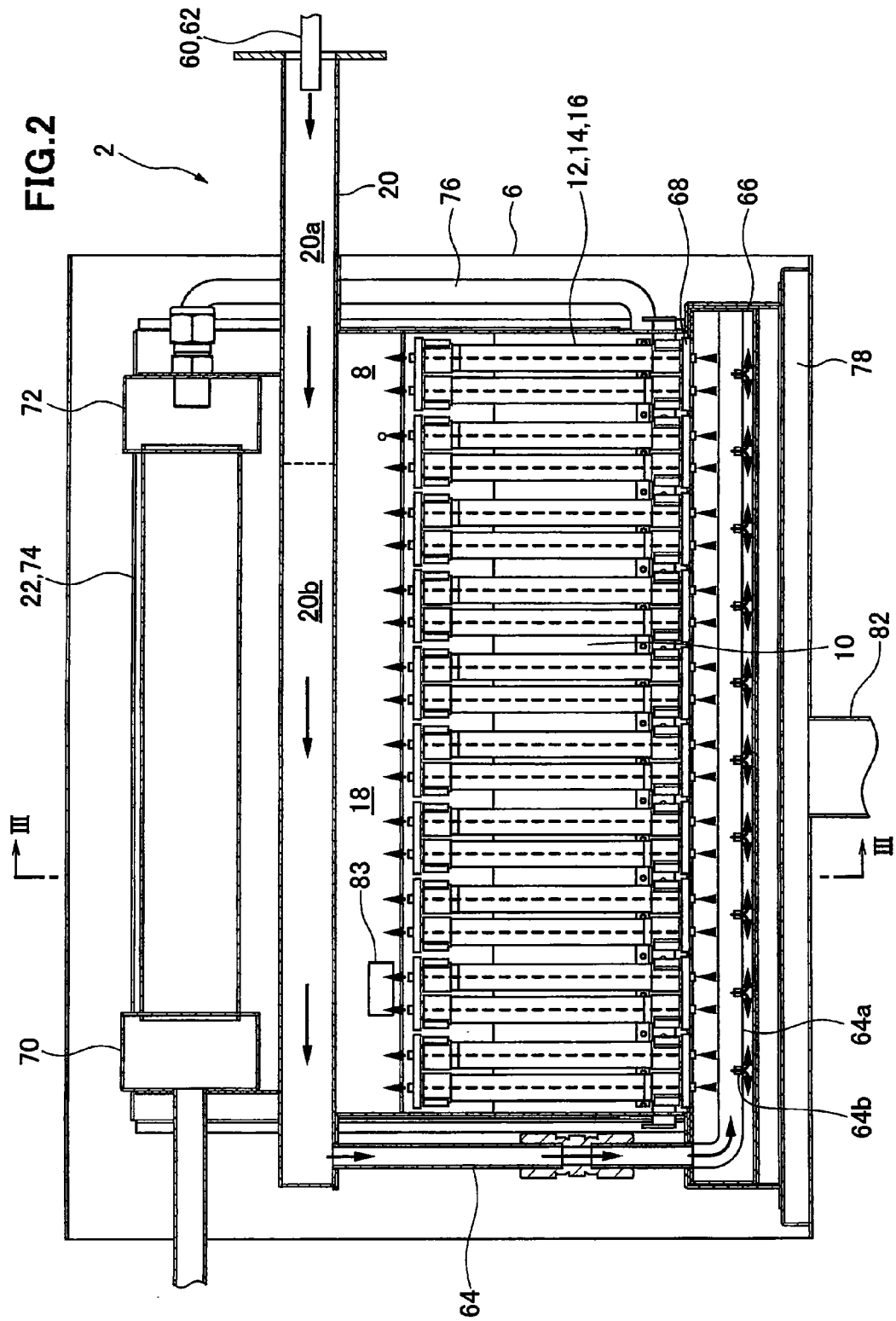
FIG. 2 is a front sectional view showing a solid oxide fuel cell (SOFC) device according to an embodiment of the present invention.
Figure 3:
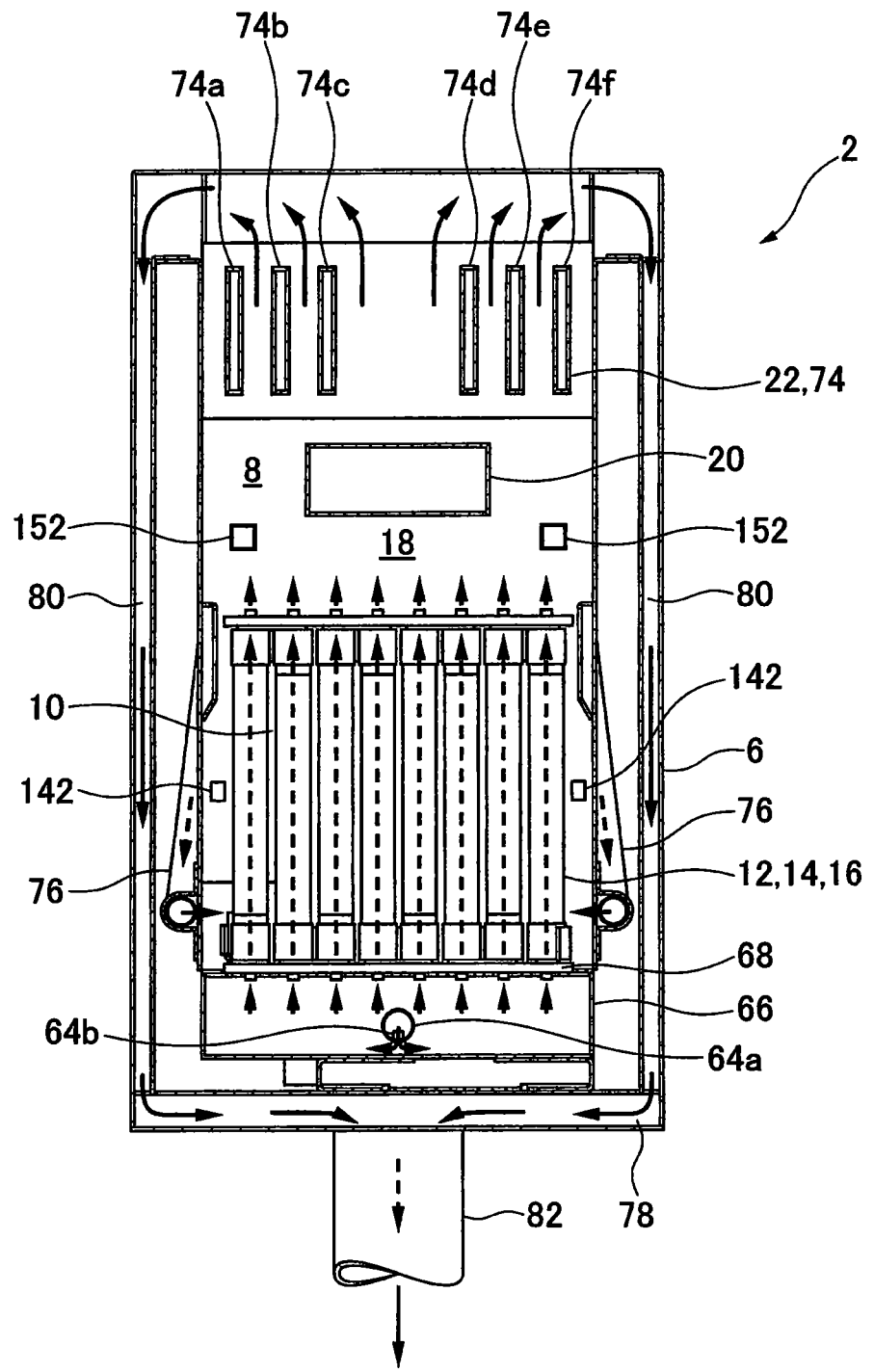
FIG. 3 is a sectional view seen along a line III-III of FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
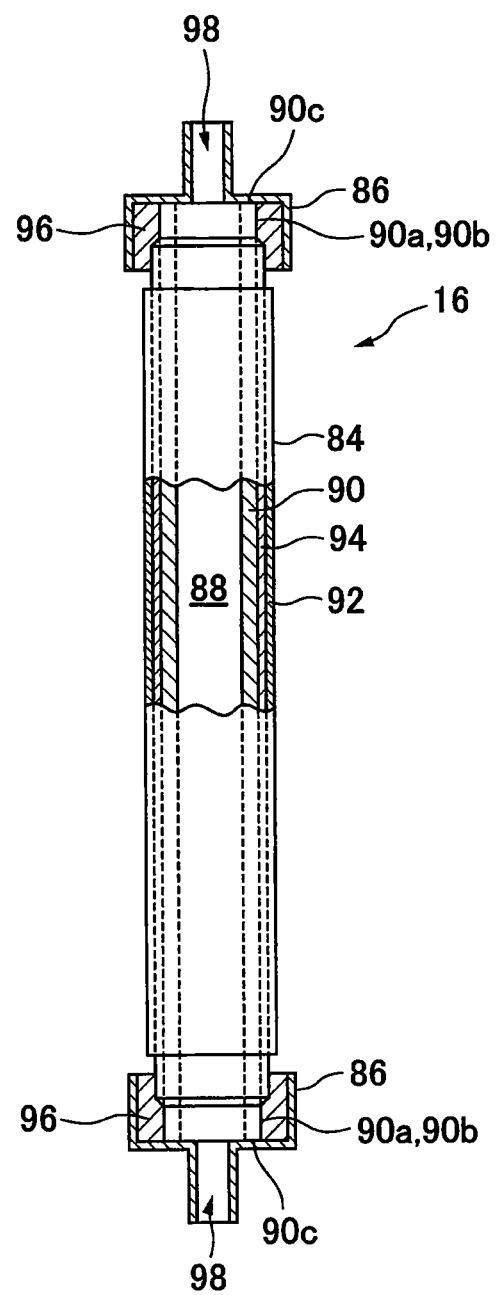
FIG. 4 is a partial sectional view showing a fuel cell unit of a solid oxide fuel cell (SOFC) device according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
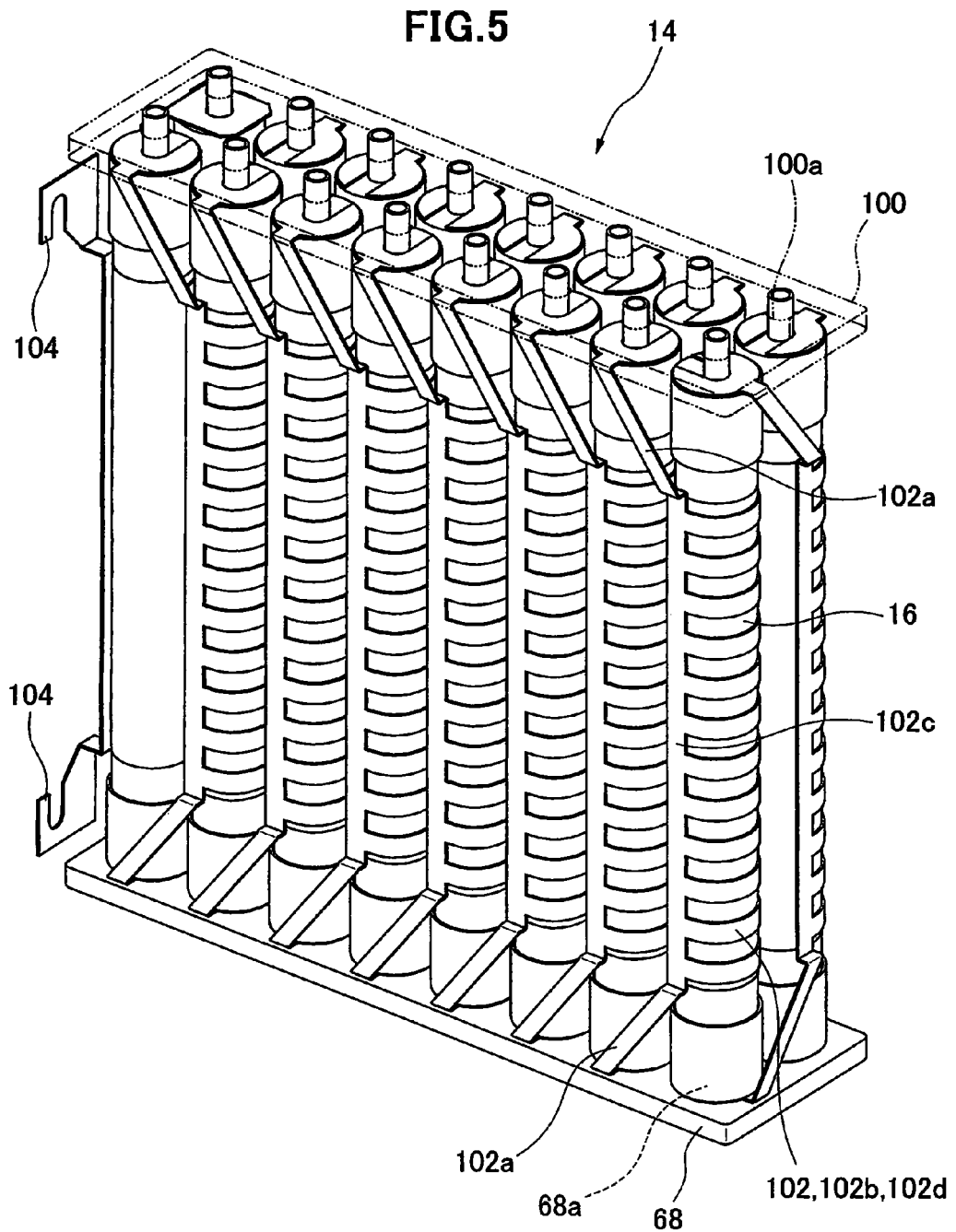
FIG. 5 is a perspective view showing a fuel cell stack of a solid oxide fuel cell (SOFC) device according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
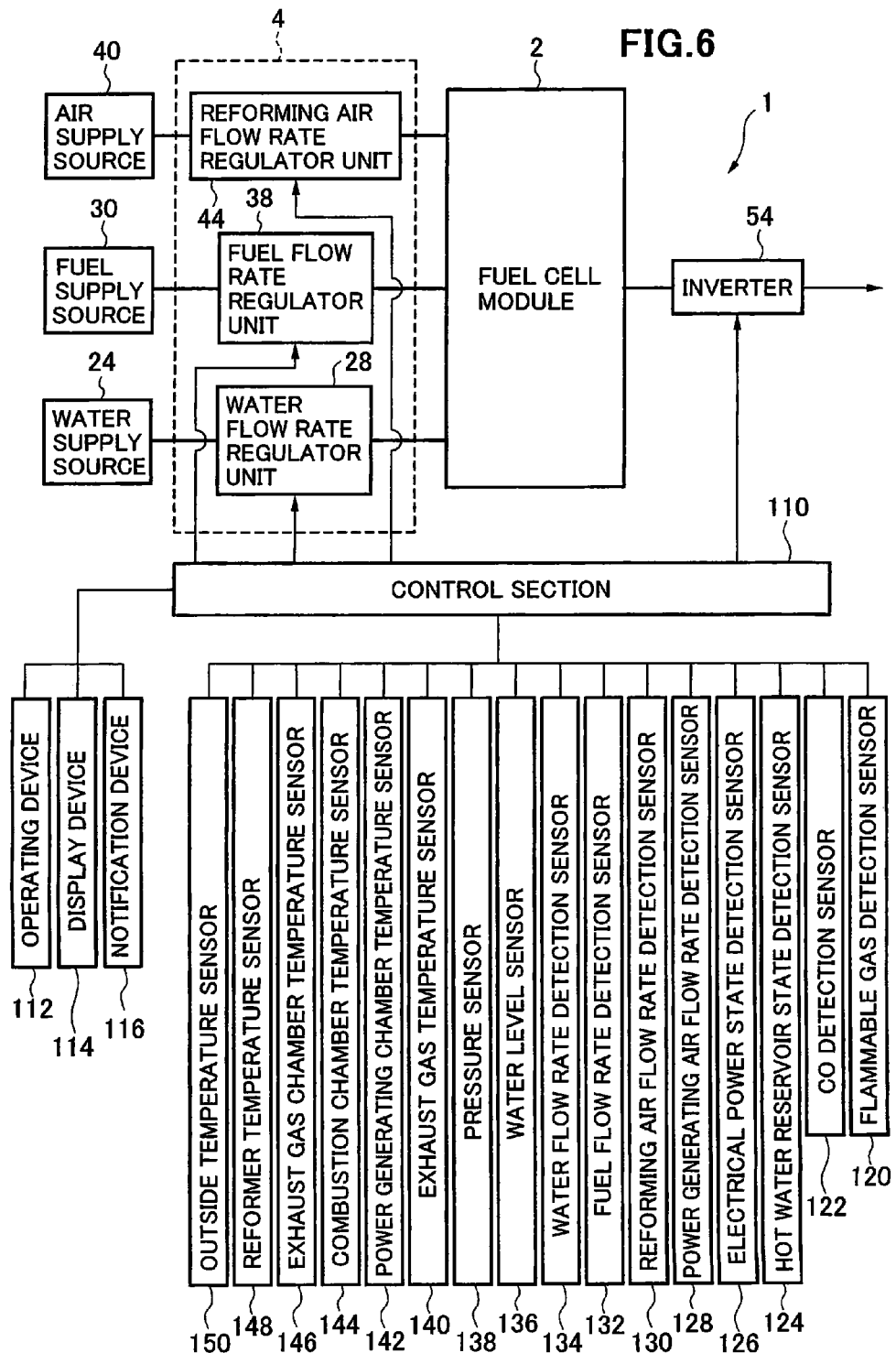
FIG. 6 is a block diagram showing a solid oxide fuel cell (SOFC) device according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
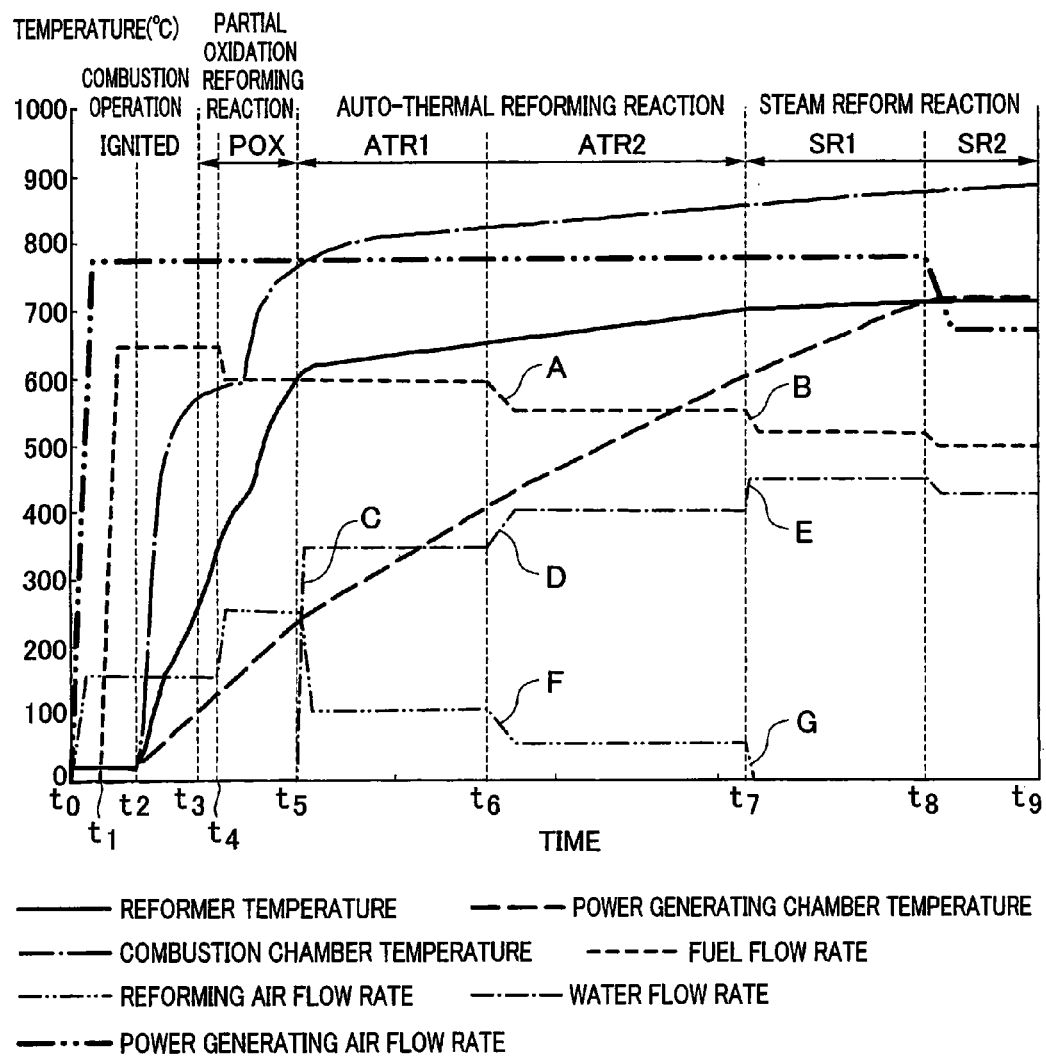
FIG. 7 is a timing chart showing an operation upon startup of a solid oxide fuel cell (SOFC) device according to an embodiment of the present invention.

Referring to FIG. 7, the operation at time of startup of an SOFC device according to the embodiment of the present invention will be described.

First, a summary of the startup of an SOFC device according to the embodiment of the present invention will be described. At the time of startup, the SOFC device undergoes a combustion operation in which fuel gas is ignited, a partial oxidation reforming reaction (POX), an auto-thermal reforming reaction (ATR), and a steam reforming reaction (SR), then transitions to an electrical power generating operation.

Here, in the partial oxidation reforming reaction (POX) region, fuel gas and reforming air are supplied to the reformer 20, and a partial oxidation reforming reaction (POX) indicated by Expression (1) proceeds in the reformer 20. This partial oxidation reforming reaction (POX) is an exothermic reaction, and therefore has good starting characteristics.

$$C_mH_n + xO_2 \rightarrow aCO_2 + bCO + cH_2 \quad (1)$$

Next, the auto-thermal reforming reaction ATR is a region in which the above-described partial oxidation reforming reaction POX and the steam reforming reaction SR described below are used together, and comprises an auto-thermal reforming reaction ATR1 in which the flow rate of water supplied a small, and an auto-thermal reforming reaction ATR2 operated after the ATR1, in which the flow rate of water is greater than that in the ATR1. In the ATR1 and ATR2 region, fuel gas, reforming air, and water are supplied to the reformer 20, and the auto-thermal reforming reactions ATR (ATR1, ATR2) shown in Expression (2) proceed in the reformer 20. An internal thermal balance is obtained in this auto-thermal reforming reaction ATR, therefore the reaction proceeds in a thermally independent manner within the reformer 20.

$$C_mH_n + xO_2 + yH_2O \rightarrow aCO_2 + bCO + cH_2 \quad (2)$$

Next, the steam reforming reaction SR comprises an SR1 in which the flow rate of fuel gas and water supplied is large, and an steam reforming reaction SR2 which is implemented after the steam reforming reaction SR1, and in which the flow rate of fuel gas and water supplied is smaller than in SR1. In these SR1 and SR2 regions, fuel gas and water are supplied to the reformer 20 (the supply of reforming air is stopped), and the steam reforming reaction SR (SR1, SR2) shown in Expression (3) proceeds in the reformer 20. This steam reforming reaction SR is an endothermic reaction, therefore the reaction proceeds as a thermal balance is achieved with the heat of combustion coming from the combustion chamber 18.

$$C_mH_n + xH_2O \rightarrow aCO_2 + bCO + cH_2 \quad (3)$$

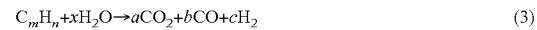

Next, referring to FIG. 7, the supply of fuel gas, reforming air, and water in each of the above described combustion operation, partial oxidation reforming reaction (POX), auto-thermal reforming reaction (ATR), and steam reforming reaction (SR) regions will be described in detail.

When the solid oxide fuel cell device 1 starts at time t0 in FIG. 7, reforming air and power generating air are supplied to the fuel cell module 2 by the reforming air flow rate regulator unit 44, which serves as the reforming air supply means, and the generating air flow rate regulator unit 45, which serves as the power generating air supply means. Note that in the embodiment of the present invention, when supply begins at time t0, the flow rate of reforming air supplied is 10 L/min, and the flow rate of power generating air supplied is 100 L/min.

Next, at time t1, the supply of fuel gas to the reformer 20 is commenced by the fuel flow rate regulator unit 38 serving as fuel supply means. Fuel and reforming air fed into each of the fuel cell units 16 flows out from the top end of each of the fuel cell units 16. In the embodiment of the present invention, the flow rate of fuel gas supplied when supply is commenced at time t1 is set at 6 L/min.

In addition, at time t2, fuel flowing out of the fuel cell unit 16 is ignited by the ignition device 83. Fuel is thus combusted in the combustion chamber 18; by this means the reformer 20 disposed thereabove is heated, and the temperature of the combustion chamber 18, power generating chamber 10, and fuel cell stack 14 disposed therein rises (times t2-t3 in FIG. 7). When the temperature of the reformer 20 reaches 300° C. as a result of heating the reformer 20, a partial oxidation reforming reaction (POX) occurs inside the reformer 20 (time t3 in FIG. 7). The partial oxidation reforming reaction is an exothermic reaction, therefore the reformer 20 is also heated by the heat of reaction which occurs during the reforming taking place in the partial oxidation reforming reaction.

When the temperature further rises and the temperature of the reformer 20 reaches 350° C., the fuel supply flow rate is reduced and the reforming air supply flow rate is increased (time t4 in FIG. 7). This results in a change in the fuel supply flow rate to 5 L/min and in the reforming air supply flow rate to 18 L/min (POX1 region). These supply flow rates are appropriate for causing reforming in the partial oxidation reforming reaction. In other words, in the initial temperature region at which reforming begins in the partial oxidation reforming reaction, increasing the fuel supply creates a state whereby fuel reliably ignites, maintaining the supply flow rate and stabilizing ignition (the POX1 region). Furthermore, after stabilization has occurred and the temperature has risen, the fuel supply flow rate sufficient for generating the partial oxidation reforming reaction is such that fuel waste can be suppressed (the POX2 region).

Next, at time t5 in FIG. 7, when the reformer 20 reaches a temperature of 600° C. or above and the fuel cell unit 16 temperature reaches 250° C. or above, the flow rate of reforming air supplied is reduced and supplying of water commences by the water flow rate regulator unit 28 serving as water supply means. This results in a change in the reforming

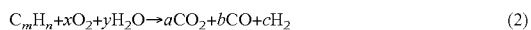

air supply flow rate to 8 L/min, and in the water supply flow rate to 2 cc/min (the ATR1 region). The steam reforming reaction in the reformer 20 is caused to occur by the introduction of water (steam) into the reformer 20. In other words, an auto-thermal reforming reaction (ATR) occurs in the ATR1 region, whereby the partial oxidation reforming reaction and the steam reforming reaction are mixed together.

In addition, the fuel supply flow rate is reduced when the reformer 20 temperature reaches 600° C. or above and the fuel cell unit 16 temperature reaches 400° C. or above at time t6 in FIG. 7. The water supply flow rate is increased along with the reduction in the reforming air supply flow rate. The fuel supply flow rate is thus changed to 4 L/min, the reforming air supply flow rate is changed to 4 L/min, and the water supply flow rate is changed to 3 cc/min (the ATR2 region). The decrease in the reforming air supply flow rate and the increase in water supply flow rate results in a decreased proportion of the partial oxidation reforming reaction in the reformer 20, and an increased proportion of the steam reforming reaction.

Next, at time t7 in FIG. 7, the supply of reforming air is stopped when the reformer 20 temperature reaches 650° C. or above and the fuel cell unit 16 temperature reaches 600° C. or above. The water supply flow rate is increased as the fuel supply flow rate is reduced. This results in the fuel supply flow rate changing to 3 L/min and the water supply flow rate changing to 8 cc/min (the SR1 region). When the supply of reforming air stops, the partial oxidation reforming reaction ceases to proceed n the reformer 20, leaving only the steam reforming reaction (SR).

Furthermore, at time t8 in FIG. 7, the fuel supply flow rate is reduced and the water supply flow rate is also reduced when the reformer 20 temperature reaches 650° C. or above and the fuel cell unit 16 temperature reaches 700° C. or above. In addition, the generating air supply flow rate is also reduced. This results in the fuel supply flow rate changing to 2.3 L/min which is a supply flow rate when waiting the start of electrical power generation, the water supply flow rate changing to 6.3 cc/min, and the generating air supply flow rate changing to 80 L/min (the SR2 region).

Thereafter, electrical power is caused to be output from the fuel cell module 2 to the inverter 54 and electrical power generation commences (time t9 in FIG. 7). The flow rates of fuel supply, generating air supply, and water supply following the start of electrical power generation are determined and supplied in accordance with the required electrical power.

Next, referring to FIG. 8, the operation at the time of startup of an SOFC device according to a variation of the embodiment of the present invention will be described.

Figure 8:
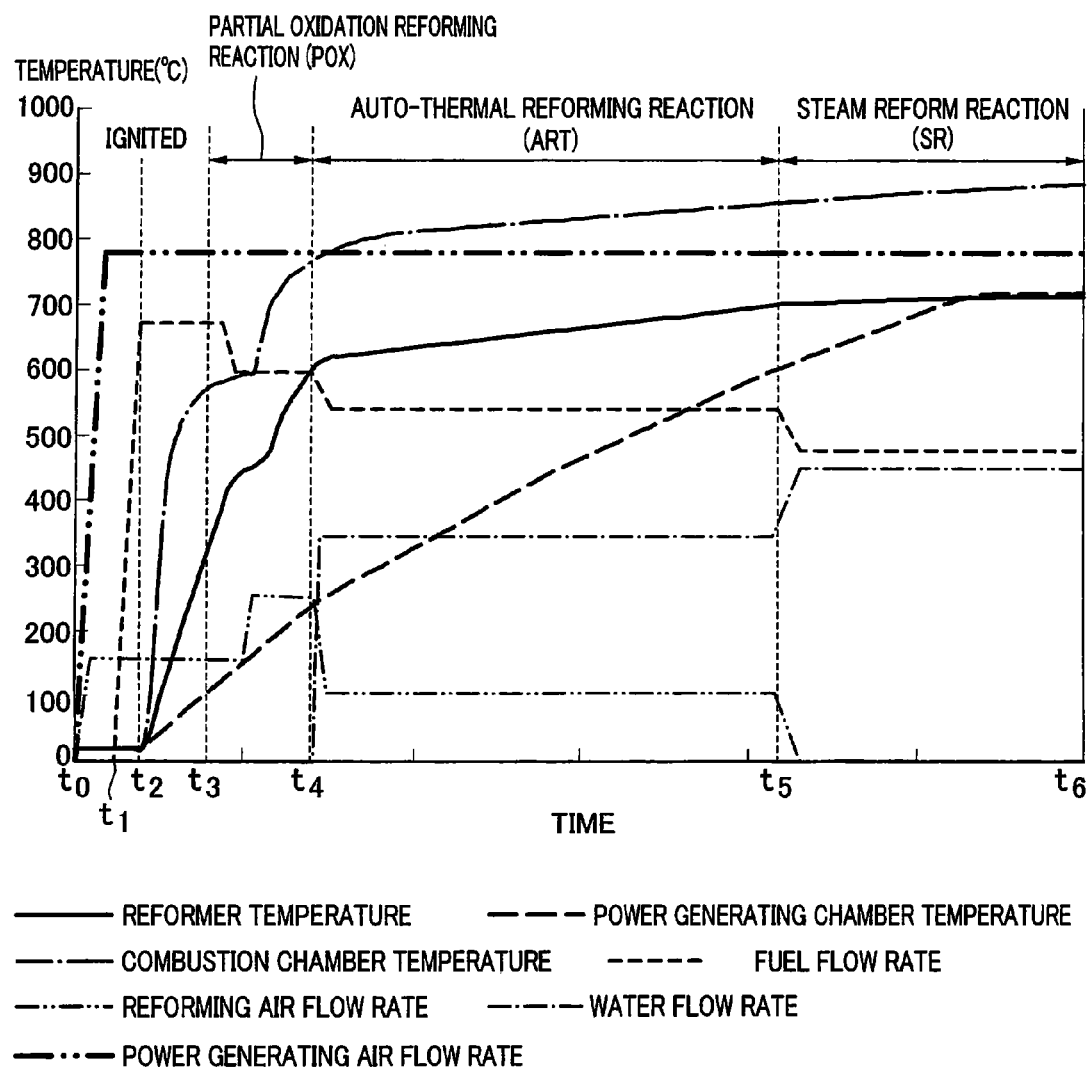
FIG. 8 is a timing chart showing an operation upon startup of a solid oxide fuel cell (SOFC) device according to a variation on an embodiment of the present invention.

As shown in FIG. 8, in this variation of the embodiment of the present invention, the auto-thermal reforming reaction (ATR) does not have the two regions ATR1 and ATR2, and in this ATR region a fixed flow rate of power generating air, fuel, water, and reforming air are respectively supplied without variation to the reformer 20. The steam reforming reaction (SR) also lacks the two regions SR1 and SR2, and in this SR region a fixed flow rate of power generating air, fuel, water, and reforming air are respectively supplied without variation to the reformer 20.

Next, referring to FIG. 9, a water supply device (water flow rate regulator unit 28) according to the embodiment of the present invention will be described in detail.

Figure 9:
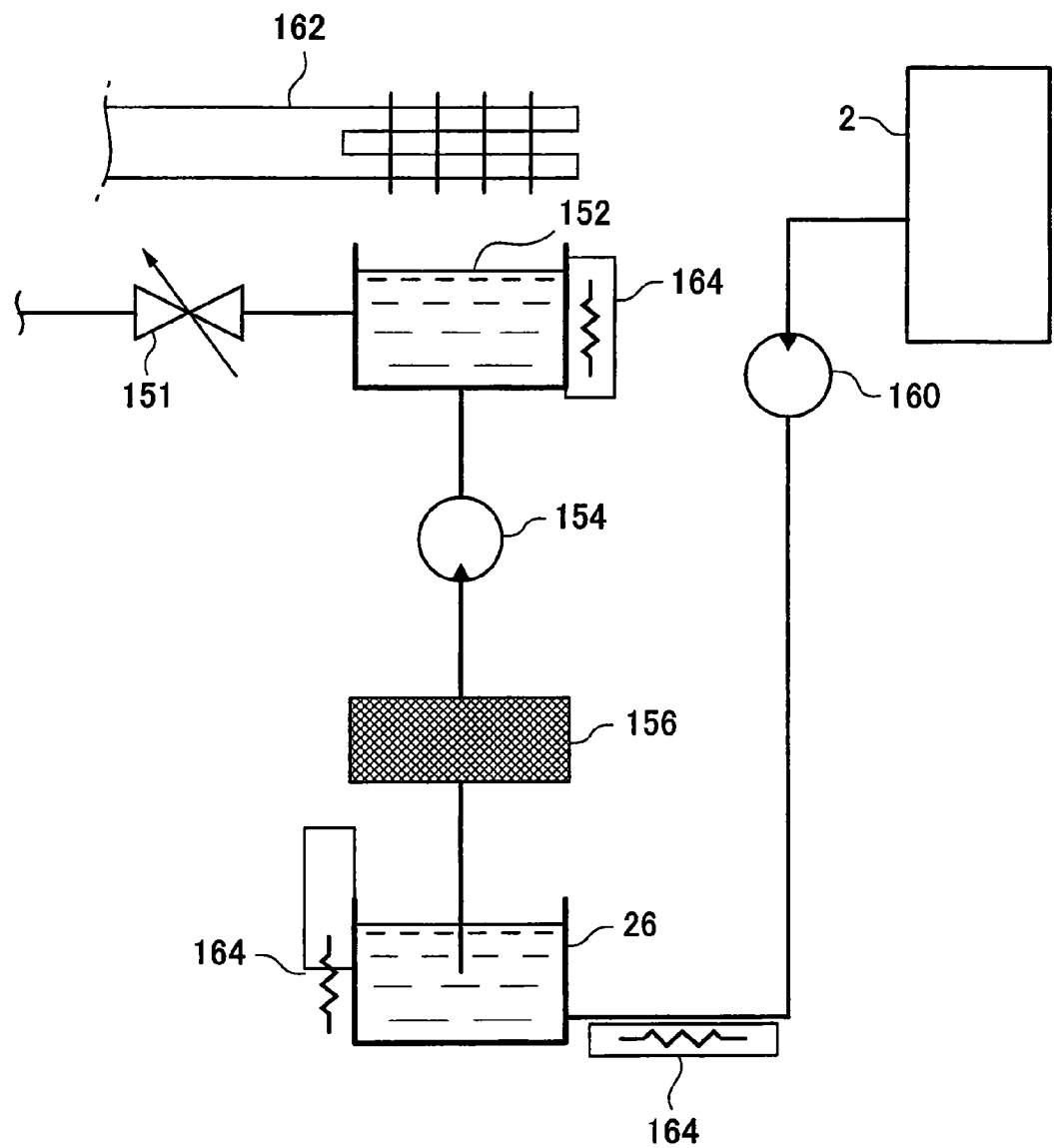
FIG. 9 is a summary view showing a water supply device in a fuel cell device according to an embodiment of the present invention.

As shown in FIG. 9, the water supply device (water flow rate regulator unit 28) is furnished with a water tank 152 for temporarily storing municipal water, a pump 154 for supplying water, an RO membrane (reverse osmosis membrane) 156 for purifying this supplied water to produce pure water, a pure water tank 26 for temporarily storing this produced pure water, and a pulse pump 160 for intermittently supplying this pure water to the reformer 20 in the fuel cell module 2 under pulsed control. To prevent freezing of the water and the pure water, a heat exchanger 162 or heater 164 is also provided.

Figure 10:
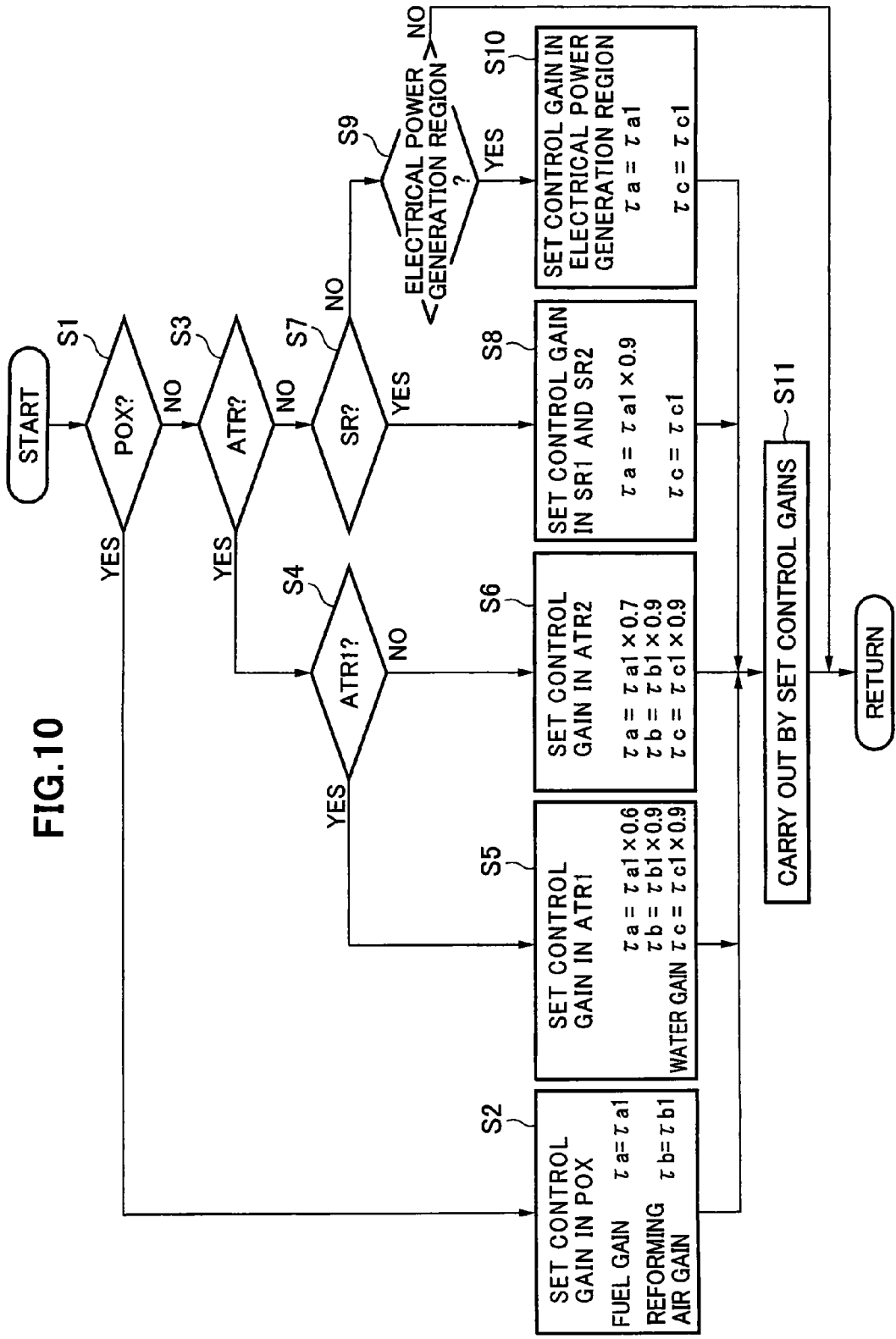
FIG. 10 is a flow chart showing the makeup of a control for controlling the fuel, water, and reforming air in a fuel cell device according to an embodiment of the present invention.

Next, referring to FIG. 10, the control of supply flow rates of fuel, water, and reforming air in the POX region, the ATR (ATR1 and ATR2) region, the SR (SR1 and SR2) region, and the power generating region in the embodiment of the present invention will be described in detail. In FIG. 10, "S" denotes each of the steps.

First, at S1, a determination is made as to whether the device is in the POX region at the time of fuel cell device startup. As discussed above, the device is determined to be in the POX region if the temperature of the reformer 20 is at or above 300° C. If it is in the POX region, the device proceeds to S2, and the control gain in the POX region is set. Regarding fuel, the fuel flow rate regulator unit 38, which serves as fuel supply means, is set to have the same control gain $\tau a$ as the reference control gain $\tau a1$ ($\tau a=\tau a1$). Regarding reforming air, the reforming airflow rate regulator unit 44, which serves as reforming air supply means, is set to have the same control gain $\tau b$ as the reference control gain $\tau b1$ ($\tau b=\tau b1$). Water is not supplied to the reformer 20 in the POX region. Note that while the control gain changes, the control compensation amount itself is not changed and the previous value itself is carried over; fluctuations caused by a decline in control gain are suppressed so that the output changes smoothly.

Next, in S2, if a determination is made that the device is not in the POX region, the device proceeds to S3 and a determination is made as to whether it is in the ATR region or not. As described above, if the temperature of the reformer 20 is at or above 600° C., and the temperature of the fuel cell unit 16 (=temperature of the power generating chamber) is at or above 250° C., the device is determined to be in the ATR region and proceeds to S4. If the temperature of the reformer 20 is at or above 600° C., and the temperature of the fuel cell unit 16 (=temperature of the power generating chamber) is at or above 250° C. and at or below 400° C. in S4, the device is determined to be in the ATR1 region and proceeds to S5.

In S5, the control gain for the ATR1 region is set. That is, the fuel flow rate regulator 38, which serves as fuel supply means, is set to have a small control gain value $\tau a$, below that of the reference control gain $\tau a1$ ($\tau a=\tau a1\times0.6$). For reforming air, similarly, the reforming air flow rate regulator unit 44, which serves as reforming air supply means, is set to have a small control gain value $\tau b$, below that of the reference control gain $\tau b1$ ($\tau b=\tau b1\times0.9$). For water, also, the water flow rate regulator 28, which serves as water supply means, is set to have a small control gain value $\tau c$, below that of the reference control gain $\tau c1$ ($\tau c=\tau c1\times0.8$). Thus in the ATR1 region, the control gain for fuel is reduced in order to suppress the influence of fuel oversupply and the like arising from pressure fluctuations associated with the water supply; gains other than the fuel control gain are also reduced accordingly, and the amount of reduction in the control gain $\tau a$, which has the greatest influence, is set to be larger than the amount of reduction in the control gains for reforming air and water.

Next, in S4, a determination is made as to whether the device is in the ATR1 region or not. If the temperature of the reformer 20 is at or above 600° C. and the temperature of the fuel cell unit 16 (=power generating chamber temperature) is at or above 400° C., the device is not in the ATR1 region but in the ATR2 region, therefore the device proceeds to S6.

In S6, the control gain for the ATR2 region is set. That is, the fuel flow rate regulator 38, which serves as fuel supply means, is set to have a small control gain value $\tau a$, below that of the reference control gain $\tau a1$ ($\tau a=\tau a1\times0.7$). For reforming air, similarly, the reforming air flow rate regulator unit 44, which serves as reforming air supply means, is set to have a small control gain value τb, below that of the reference control gain τb1 (τb=τb1×0.9). For water, also, the water flow rate regulator 28, which serves as water supply means, is set to have a small control gain value τc, below that of the reference control gain τc1 (τc=τc1×0.9). Thus in the ATR2 region, the amount of reduction in the fuel control gain is set to be larger than the amount of reduction in the air and water control gain. The amount of reduction in the fuel control gain and water control gain in the ATR2 region is set to be smaller, so as to be moderate relative to the amount of reduction in the fuel control gain in the ATR1 region. This is done in response to the relaxation of the pressure fluctuation factor associated with the increase in the flow rate of water supplied.

Next, in S3, when it is determined that the device is not in the ATR region, the device proceeds to S7, and a determination is made as to whether it is in the SR region or not. As described above, if the temperature of the reformer 20 is at or above 650° C. and the temperature of the fuel cell unit 16 (=temperature of the generating chamber) is at or above 600° C., the device is in the SR region and therefore advances to S8, where the control gain for the SR1 and SR2 regions is set. For fuel, the fuel flow rate regulator 38, which serves as fuel supply means, is set to have a small control gain value τa, below that of the reference control gain τa1 (τa=τa1×0.9). For water, the water flow regulator 28, which serves as water supply means, is set to have the same control gain τc as the reference control gain τc1 (τc=τc1). Note that reforming air is not supplied in the SR1 and SR2 regions.

Next, in S7, if a determination is made that the device is not in the SR region, it is in the electrical power generation operating region and therefore proceeds to S9. In S9, for fuel, the fuel flow rate regulator 38, which serves as fuel supply means, is set to have the same control gain τa as the reference control gain τa1 (τa=τa1). For water, similarly, the water flow rate regulator 28, which serves as water supply means, is set to have the same control gain τc as the reference control gain τc1 (τc=τc1).

Next, the device proceeds to S11, where fuel, reforming air, and water are supplied to the reformer 20 at the respective control gains set for the fuel flow rate regulator unit 38, the reforming air flow rate regulator unit 44, and the water flow rate regulator unit 28.

Next, again referring to FIG. 7, the amount of change in the supply flow rates (target supply flow rates) for fuel, reforming air, and water at the time of transition from the POX region to the ATR region, the time of transition from the ATR region to the SR region, and the like in the embodiment of the present invention will be described in detail.

First, the respective fuel supply flow rates (target supply flow rates) at the time of transition from the ATR1 region to the ATR2 region (time t6 in FIG. 7) and the time of transition from the ATR2 region to the SR1 region (time t7 in FIG. 7) are changed so as to decline down to the target supply flow rate. The amount of change to the fuel target supply flow rate per unit time (target value change gain) is a smaller value at the time of transition from ATR1 to ATR2 than at the time of transition from ATR2 to SR1. Specifically, in FIG. 7 the amount of change per unit time indicated by A is a smaller value than the amount of change per unit time indicated by B (slope is more gradual).

Next, the water supply flow rates (target supply flow rates) for the time of transition from POX to ATR1 (time t5 in FIG. 7) and for the time of transition from ATR1 to ATR2 (time t6 in FIG. 7) are respectively increased to the target supply flow rate. The amount of change (target value change gain) per unit time in the water target supply flow rate is a smaller value at the time of transition from ATR1 to ATR2 than at the time of transition from POX to ATR1. Specifically, in FIG. 7 the amount of change per unit time indicated by D is a smaller value than the amount of change per unit time indicated by C (slope is more gradual).

In addition, the water supply flow rate (target supply flow rate) is changed so as to increase to the target supply flow rate in the time of transition from ATR2 to SR1 (time t7 in FIG. 7). The amount of change (target value change gain) per unit time in the water target supply flow rate is a smaller value at the time of transition from ATR1 to ATR2 than at the time of transition from ATR2 to SR1. Specifically, in FIG. 7 the amount of change per unit time indicated by D is a smaller value than the amount of change per unit time indicated by E (slope is more gradual).

Next, the reforming air supply flow rates (target supply flow rates) for the time of transition from ATR1 to ATR2 (time t6 in FIG. 7) and the time of transition from ATR2 to SR1 (time t7 in FIG. 7) are respectively reduced to the target supply flow rate. The amount of change (target value change gain) per unit time in the fuel target supply flow rate is a smaller value at the time of transition from ATR1 to ATR2 than at the time of transition from ATR2 to SR1. Specifically, in FIG. 7 the amount of change per unit time indicated by F is a smaller value than the amount of change per unit time indicated by G (slope is more gradual).

Next, referring to FIGS. 7 through 11, the operation of a fuel cell device according to the embodiment of the present invention described above will be described in detail.

First, in the ATR region where the supply flow rate of water is extremely small, a very expensive specialized pump conventionally had to be used in order to accurately and stably supply extremely small amounts of water such as several milliliters per minute, but in the embodiment of the present invention, as shown in FIG. 10, water is intermittently supplied to the reformer 20 under pulsed control using a pulse pump 160 in place of the conventional high cost specialized pump, therefore a simple structure and low-cost pump can be employed, and more easily controlled pulsed control is possible.

Next, in the embodiment of the present invention, as shown in FIG. 10, the fuel flow rate regulator 38, which serves as fuel supply means, is set to have a small control gain value τa, below that of the reference control gain τa1 (τa=τa1×0.6 and τa=τa1×0.7) in the ATR1 and ATR2 regions. Therefore when fuel is supplied to the reformer 20 in the ATR region, a following delay arises in the fuel supply flow rate relative to the target supply flow rate.

Figure 11:
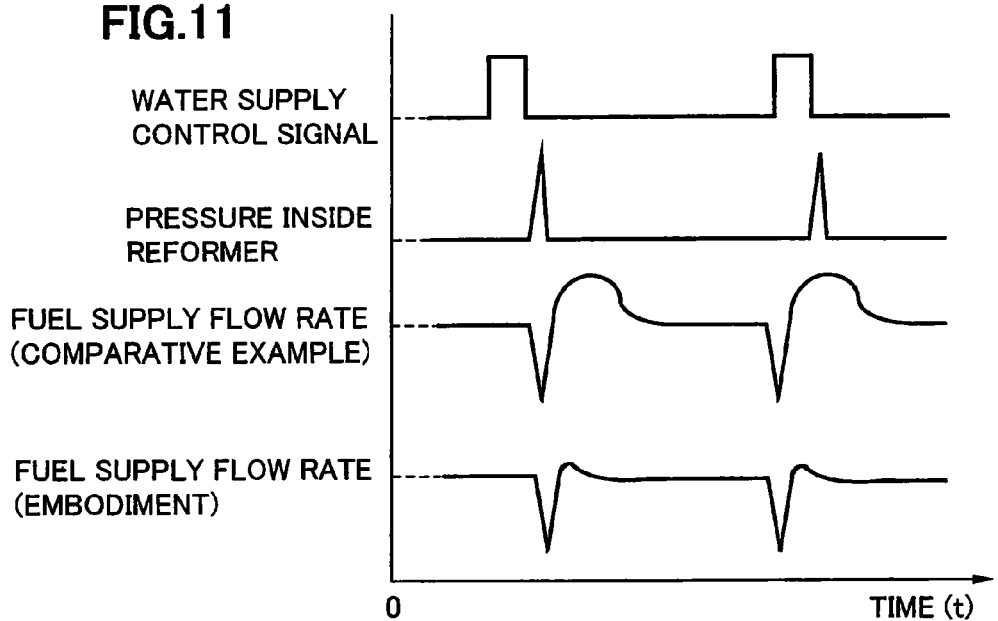
FIG. 11 is a timing chart showing states inside a reformer in the ATR region according to an embodiment of the present invention.

Referring to FIG. 11, the state within the reformer in the ATR region (ATR1 and ATR2) will be described.

First, regarding the supply of water, an extremely small amount of water is intermittently supplied into the reformer 20 by the pulse pump 160 of the water flow rate regulator unit 28 serving as water supply means, based on a pulse-shaped water supply control signal. This water turns to steam in the reformer, therefore pressure inside the reformer 20 rises immediately after the water is supplied. This rise in pressure inside the reformer makes it difficult to supply fuel into the reformer 20. Therefore in FIG. 11, as shown by the fuel supply flow rate (comparative example: uses reference control gain), the fuel supply flow rate detection sensor detects the state in which the fuel supply flow rate is less than the target value when the pressure rises, then immediately judges that fuel is insufficient, and a control is exercised to supply additional fuel. In actuality however, the pressure drops in the next instant, making fuel easier to supply, but since there is an increase by the amount of fuel considered to be insufficient, notwithstanding the fact that there is actually no such need, the result is an oversupply of fuel gas.

In order to prevent the type of fuel oversupply shown in the fuel supply flow rate in a comparative example, the control gain of the fuel flow rate regulator unit 38 serving as fuel supply means is reduced in the ATR region, as indicated by the fuel supply flow rate of the embodiment in FIG. 11, thereby causing a following delay against the target supply flow rate, and thus enabling prevention of a fuel oversupply caused by the rise in pressure inside the reformer which occurs immediately after the supply of water described above.

Thus, according to the embodiment of the present invention, changes in the insufficient of fuel supply are suppressed by reducing the control gain immediately after water is supplied to the reformer by the pulsed pump 160 (over a predetermined interval), thereby enabling the prevention of a fuel oversupply immediately after the supply of water described above and, as a result, enabling a stable fuel supply and stable auto-thermal reforming reaction in the ATR region even using intermittent control by a simple, low-cost pump.

Next, as shown in FIG. 10, in the ATR region (ATR1 and ATR2) of the present embodiment, the control gains $\tau a1$ ($\tau a=\tau a1 \times 0.6$ and $\tau a=\tau a1 \times 0.7$) of fuel flow rate regulator unit 38 as the fuel supply means are caused to be less than those of the POX region ($\tau a=\tau a1$) and the SR region ($\tau a=\tau a1$). As a result, in the present embodiment the control gain for the fuel supply means (fuel flow rate regulator unit 38) is caused to be lowest in the ATR region compared to that of the other regions at the time startup, i.e., the POX region and the SR region, therefore even in the ATR region, where supply of an extremely small amount of water is required, fuel oversupply and control hunting caused by pressure fluctuations arising from the intermittent supply of water into the reformer 20 can be reliably prevented.

Next, as described above, it is believed that by causing the control gain of the fuel supply means (fuel flow rate regulator unit 38) to be lower in the ATR region than in other regions, the control capability for maintaining the fuel supply flow rate accurately based on the fuel flow rate sensor 132 is reduced, and as a result control problems arise due to control delays. However, in the embodiment of the present invention, as shown in FIG. 8, the supply flow rate of reforming air from the reforming air flow rate regulator unit 44 serving as reforming air supply means, and the supply flow rate of water from the water flow rate regulator unit 28 serving as water supply means are respectively held at a fixed amount without being changed in the ATR region. As a result, in the ATR region of the embodiment of the present invention, the supply flow rates of reforming air and water which affect the control of the fuel supply flow rate are respectively held constant without change, and changes in the fuel supply flow rate are to the greatest extent possible prevented from occurring, therefore the occurrence of control problems caused by the reduction in control gain of the fuel supply means (fuel flow rate regulator unit 38) can be reliably prevented.

Note that in the embodiment of the present invention, as shown in FIG. 7, the flow rate of reforming air supplied by the reforming air flow rate regulator unit 44 serving as reforming air supply means, and the flow rate of water supplied by the water flow rate regulator unit 28 serving as water supply means, are similarly held constant without changing in the respective ATR1 and ATR2 regions. A similar result can thus be obtained.

Next, as shown in FIG. 7, in the embodiment of the present invention, the target supply flow rate of water is changed in the time of transition from POX to ATR1 (time t5 in FIG. 7) and in the time of transition from ATR1 to ATR2 (time t6 in FIG. 7); at this point the amount of change in the target supply flow rate of water per unit time is smaller during the time of transition from POX to ATR1 than in the time of transition from ATR1 to ATR2. As a result, in the embodiment of the present invention, there is a risk from the reduction in the fuel supply means (fuel flow regulator unit 38) control gain in the ATR region of a fuel supply following delay, particularly when the change in fuel target supply flow rate occurs in a time of transition from POX to ATR1, but because the amount of change (target value change gain) per unit time in the target supply flow rate of water was reduced from POX to ATR1, a following delay in the fuel target supply flow rate associated with the reduction in the fuel supply means (fuel flow rate regulator unit 38) control gain can be reliably prevented.

Next, as shown in FIG. 7, in the embodiment of the present invention, the target supply flow rates for fuel, reforming air, and water are respectively changed for the time of transition from ATR1 to ATR2 (time t6 in FIG. 7) and the time of transition from ATR2 to SR (time t7 in FIG. 7), while the amount of change per unit time in the target supply flow rate of fuel, reforming air, and water at the time of transition from ATR1 to ATR2 and the time of transition from ATR2 to SR are respectively reduced, and the amount of change per unit time in each of those target supply flow rates is made smaller for the time of transition from ATR1 to ATR2 than for the time of transition from ATR2 to SR.

Therefore as shown in FIG. 7, more water is supplied in the time of transition from ATR2 to SR than in the time of transition from ATR1 to ATR2, thereby making more frequent the timing of the water supply intervals, such that pressure fluctuations in the reformer 20 are alleviated and pressure is stabilized at a high level, thereby alleviating the problem of oversupply fuel associated with pressure fluctuations. Thus in the embodiment of the present invention, the fuel supply means (fuel flow rate regulator unit 38) control gain is reduced, and the amount of change per unit time in the target supply flow rate (target value change gain) is made smaller for the time of transition from ATR1 to ATR2 than for the time of transition from ATR2 to SR, so that the problems of fuel oversupply and hunting associated with pressure fluctuations, as well as the problem of following delays relative to fuel targets supply flow rate, can be skillfully balanced at a high level and resolved.

Next, as shown in FIG. 10, in the present embodiment the amount of reduction in the fuel supply means (fuel flow regulator unit 38) control gain in the ATR2 region is set to be smaller than the amount of reduction in the control gain in the ATR1 region. Here, as shown in FIG. 7, more water is supplied in the ATR2 region than in the ATR1 region, resulting in a more frequent intermittent water supply interval, thus stabilizing pressure in a high-pressure state and enabling alleviation of the fuel oversupply problem associated with pressure fluctuations. Therefore in the present embodiment, by reducing the amount of reduction in the control gain of the fuel supply means (fuel flow regulator unit 38) more in the ATR2 region than in the ATR1 region, fuel oversupply and reduced following performance relative to the target field value can be suppressed and following delays can be simultaneously alleviated.

Next, as shown in FIG. 10, in the embodiment of the present invention, the control gain of the fuel supply means (fuel flow rate regulator unit 38) for the ATR region and the SR region is reduced below that of the POX region, and the amount of reduction in the fuel supply means control gain for the SR region is made smaller than the amount of reduction in the control gain in the ATR region. As shown in FIG. 7, more water is supplied in the SR region than in the ATR region, resulting in a more frequent intermittent water supply interval, thus stabilizing pressure in a high-pressure state so that oversupply of fuel caused by pressure fluctuations can be alleviated. Therefore in the embodiment of the present invention, causing the amount of reduction in the fuel supply means (fuel flow rate regulator 38) control gain to be smaller in the SR region than the amount of the control gain reduction in the ATR region enables the suppression of fuel oversupply associated with pressure fluctuations while at the same time resolving the opposite problem of target supply fuel flow rate following delay at a high level.

Next, as shown in FIG. 10, in the present embodiment the reforming air supply means (reforming airflow regulator unit 38) control gain is made smaller in the ATR region than in the POX region. Here, as with the fuel supply means (fuel flow regulator unit 38) control gain, the reforming air supply means (reforming airflow regulator unit 38) control gain is reduced in the ATR region, therefore the oversupply of air caused by pressure fluctuations arising from intermittent supply of water into the reformer can be prevented.

Next, as shown in FIG. 10, the amount of reduction in the fuel supply means (fuel flow rate regulator unit 38) control gain is made larger in the ATR region than the amount of reduction in the reforming air supply means (reforming air flow rate regulator unit 44) control gain. Here, the flow rate of reforming air supplied into the reformer fluctuates with the flow rate of fuel supplied, due to pressure fluctuations in the reformer associated with the intermittent water supply. Therefore in the embodiment of the present invention, because the reforming air supply means (reforming airflow rate regulator unit 44) control gain was also reduced, oversupply of air and control gain hunting can be even more reliably prevented. Also, the flow rate of reforming air supplied is extremely large compared to the flow rate of fuel supplied, therefore reforming air is less influenced by pressure fluctuations caused by vaporization of water. Since in the embodiment of the present invention, the amount of reduction in the reforming air supply means (reforming air flow rate regulator unit 44) control gain is made smaller than the amount of reduction in the fuel supply means (fuel flow rate regulator unit 38) control gain, unnecessary following delays relative to the target supply flow rate of reforming air can thus be reliably prevented.

Figure 12:
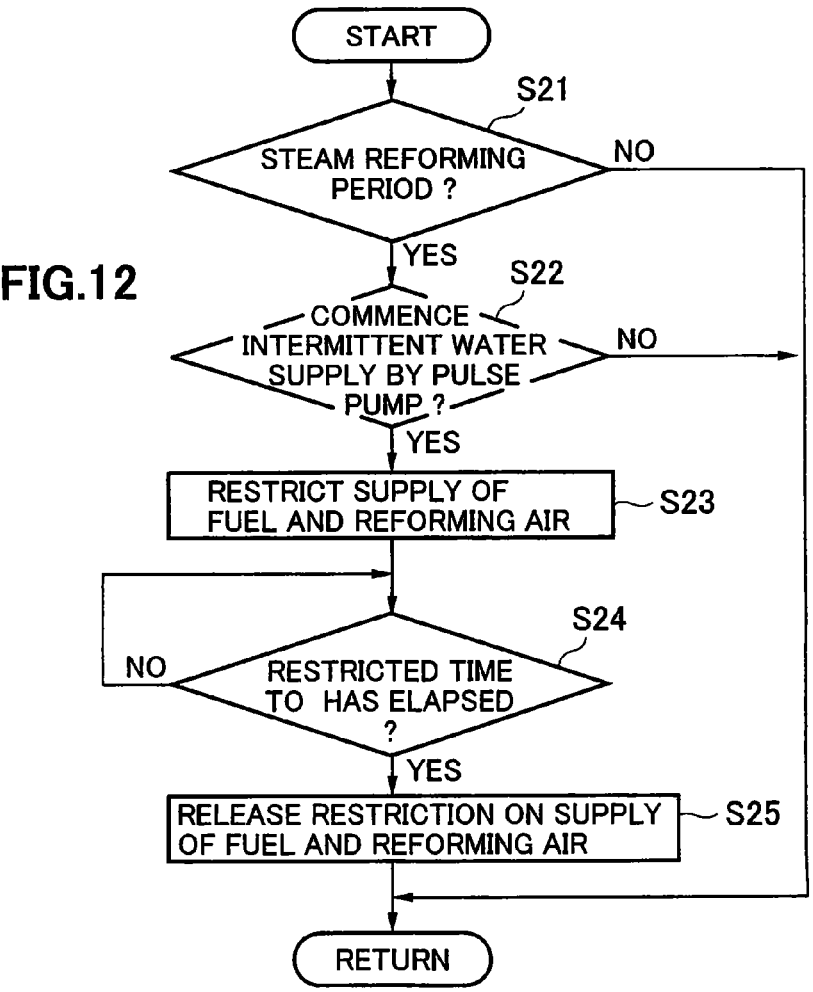
FIG. 12 is a flowchart showing the makeup of a control for controlling the supply quantities of fuel, water, and reforming air in a fuel cell device according to another embodiment of the present invention.

Next, referring to FIG. 12, a fuel cell device according to another embodiment of the present invention will be described. In FIG. 12, "S" denotes the various steps.

As shown in FIG. 12, in S21 a determination is made of whether the device is in the steam reforming predetermined period or not. Here, the steam reforming predetermined period refers to the above-described ATR (including ATR1 and ATR2) region and the SR region. If it is in the steam reforming predetermined interval, the device proceeds to S22, and a determination is made as to whether intermittent water supply into the reformer 20 by the pulse pump 160 has commenced.

When the supply of water starts, the device proceeds to S23, and the supply of fuel and reforming air is restricted to a restricted time T0, which is the predetermined interval described below. Specifically, oversupply of fuel is prevented by holding the flow rate of fuel and reforming air supplied to a control value (a fixed value). Next, the device proceeds to S24, and a determination is made as to whether the restricted time T0 has elapsed. If it has elapsed, the device proceeds to S25, and the restriction on the supply of fuel and reforming air is released.

Note that in other embodiments, the supply of both fuel and reforming air was restricted at the restricted time T0, but it is also acceptable to restrict the fuel supply only.

In the other embodiment of the present invention described above, fuel supplied by the fuel supply means (fuel flow rate regulator unit 38) and reforming air supplied by the reforming air supply means (reforming air flow rate regulator unit 44) is restricted during a restricted time T-0, which is a predetermined interval following the supply of water by the pulse pump, therefore oversupply of fuel caused by pressure fluctuations arising from the intermittent supply of water into the reformer 20 by the pulse pump 160 can be reliably prevented. A similar effect can be achieved by restricting only the supply of fuel by the fuel supply means (fuel flow rate regulator 38).

Although the present invention has been explained with reference to specific, preferred embodiments, one of ordinary skilled in the art will recognize that modifications and improvements can be made while remaining within the scope and spirit of the present invention. The scope of the present invention is determined solely by appended claims.

What is claimed is:

1. A fuel cell system for generating power by using fuel reformed by a reformer, said fuel cell system comprising:
   a fuel supply device that supplies fuel to the reformer;
   a reforming air supply device that supplies reforming air to the reformer;
   a water supply device that produces pure water and supplies the pure water to the reformer;
   a fuel supply flow rate detection sensor that detects a flow rate of the fuel supplied by the fuel supply device;
   a reforming air supply flow rate detection sensor that detects a flow rate of the reforming air supplied by the reforming air supply device;
   a water supply flow rate detection sensor that detects a flow rate of the water supplied by the water supply device; and
   a control device programed to control, when the fuel cell system is started, the flow rate of the fuel supplied by the fuel supply device, the flow rate of the reforming air supplied by the reforming air supply device, and the flow rate of the water supplied by the water supply device to supply the fuel, the reforming air, and the water into the reformer to conduct an auto-thermal reforming reaction (ATR) operation, then to supply the fuel and the water into the reformer to conduct a steam reforming reaction (SR) operation;
   wherein the water supply device comprises a pump operated to intermittently supply the water to the reformer,
   the control device is further programed to control the fuel supply device, the reforming air supply device, and the water supply device, respectively, to supply the fuel, the reforming air and the water at target supply flow rates, respectively, based on respective outputs of the fuel supply flow rate detection sensor, the reforming air supply flow rate detection sensor, and the water supply flow rate detection sensor, and
   the control device further programed to substantially suppress, during the ATR operation, changes in the flow rate of the fuel supplied by the fuel supply device during at least a predetermined interval following a start of water supply by the pump.

2. The fuel cell system according to claim 1, wherein the control device is programed to substantially suppress the flow rate of fuel by the fuel supply device during the predetermined interval following the supply of water by the pump.

3. The fuel cell system according to claim 1, wherein the control device is programed to reduce a control gain of the fuel supply device more in the ATR operation than in the SR operation.

4. The fuel cell system according to claim 3, wherein the control device is programed to maintain, in the ATR operation, substantially constant the flow rates of the reforming air supplied by the reforming air supply device and the water supplied by the water supply device.

5. The fuel cell system according to claim 3, wherein:
the controller device is programed to supply, when the fuel cell system is started, the fuel and the reforming air into the reformer to conduct a partial oxidation reforming reaction (POX) operation before the ATR operation;
the ATR operation includes an auto-thermal reforming reaction 1 (ATR1) operation in which the flow rate of water supply is small, and an auto-thermal reforming reaction 2 (ATR2) operation, implemented after the ATR1 operation, in which the flow rate of water supply is large; and
the control device is programed to change at least a target supply rate of the water during a transition from the POX operation to the ATR1 operation and a transition from the ATR1 operation to the ATR2 operation, and the control device makes a change rate of the target supply rate of the water smaller for the transition from the ATR1 operation to the ATR2 operation than for the transition from the POX operation to the ATR1 operation.

6. The fuel cell system according to claim 5, wherein the control device is programed to change respective target supply rates of the fuel, the reforming air, and the water during the transition from the ATR1 operation to the ATR2 operation and a transition from the ATR2 operation to the SR operation, and the control device is further programed to reduce a change rate of the target supply rates of the fuel, the reforming air, and the water during the transition from the ATR1 operation to the ATR2 operation and the transition from the ATR2 operation to the SR operation, and make the change rate of the target supply rates of the fuel, the reforming air, and the water smaller for the transition from the ATR1 operation to the ATR2 operation than for the transition from the ATR2 operation to the SR operation.

7. The fuel cell system according to claim 3, wherein:
the controller device is programed to supply, when the fuel cell system is started, the fuel and the reforming air into the reformer to conduct a partial oxidation reforming reaction (POX) operation before the ATR operation;
the ATR operation includes an auto-thermal reforming reaction 1 (ATR1) operation in which the flow rate of water supply is small, and an auto-thermal reforming reaction 2 (ATR2) operation, implemented after the ATR1 operation, in which the flow rate of water supply is greater than that of the ATR1 operation; and
the control device is further programed to reduce the control gain of the fuel supply device used for the ATR1 operation and the ATR2 operation more than for the POX operation or the SR operation, and also make a reduction amount of the control gain of the fuel supply device for the ATR2 operation smaller than that for the ATR1 operation.

8. The fuel cell system according to claim 3, wherein:
the controller device is programed to supply, when the fuel cell system is started, the fuel and the reforming air into the reformer to conduct a partial oxidation reforming reaction (POX) operation before the ATR operation;
the control device is programed to reduce a control gain of the fuel supply device for the ATR operation and the SR operation more than for the POX operation; and
the control device is programed to make a reduction amount of the control gain of the fuel supply device for the SR operation smaller than that for the ATR operation.

9. The fuel cell system according to claim 3, wherein
the controller device is programed to supply, when the fuel cell system is started, the fuel and the reforming air into the reformer to conduct a partial oxidation reforming reaction (POX) operation before the ATR operation, and
the control device is programed to reduce a control gain of the reforming air supply device more in the ATR operation than in the POX operation.

10. The fuel cell system according to claim 9, wherein in the ATR operation, the control device is programed to make a reduction amount of the control gain of the fuel supply device greater than a reduction amount of the control gain of the reforming air supply device.

* * * * *